United States Patent [19]
Brady et al.

[11] Patent Number: 5,189,985
[45] Date of Patent: Mar. 2, 1993

[54] EXPANDABLE HAY FEEDER

[76] Inventors: James L. Brady, Rte. 1 Box 132, Coward, S.C. 29530; Carl T. Stokes, Rte. 4 Box 189, Darlington, S.C. 29532

[21] Appl. No.: 853,903

[22] Filed: Mar. 19, 1992

[51] Int. Cl.⁵ ............................................. A01K 1/10
[52] U.S. Cl. ................................... 119/60; 119/51.03
[58] Field of Search ....................... 119/58, 59, 60, 70, 119/10, 18, 51.03, 57.8, 57.9, 52.2, 52.3

[56] References Cited
U.S. PATENT DOCUMENTS

| | | | |
|---|---|---|---|
| 988,599 | 4/1911 | Shaw | 119/60 |
| 1,092,314 | 4/1914 | White | 119/51.03 |
| 1,129,761 | 2/1915 | Towle | 119/60 |
| 1,221,019 | 4/1917 | Bowdish | 119/51.03 |
| 1,253,002 | 1/1918 | Collins | 119/70 |
| 2,830,558 | 4/1958 | Pierre | 119/60 |

FOREIGN PATENT DOCUMENTS

| | | | |
|---|---|---|---|
| 155083 | 12/1920 | United Kingdom | 119/58 |
| 916043 | 1/1963 | United Kingdom | 119/60 |
| 2071985 | 9/1981 | United Kingdom | 119/60 |

Primary Examiner—Robert P. Swiatek
Assistant Examiner—Todd E. Manahan
Attorney, Agent, or Firm—Michael A. Mann

[57] ABSTRACT

An expandable hay feeder, comprises a stretchable, resilient grid attached to a frame. The frame is secured to a wall or surface by a pair of hinges on one side and a latch on the other so that the frame can be unlatched and rotated away from the surface for adding hay. The hay is held between the wall or surface and the stretched grid in such a way that an animal can feed through the holes defined by the grid. The cords of the grid are made of rubber cores covered with abrasion-resistant fabric. "S" hooks hold the grid to the frame. A surface is provided in an alternate embodiment for opposing the stretched grid when the device is to be mounted to a fence or other open surface.

15 Claims, 3 Drawing Sheets

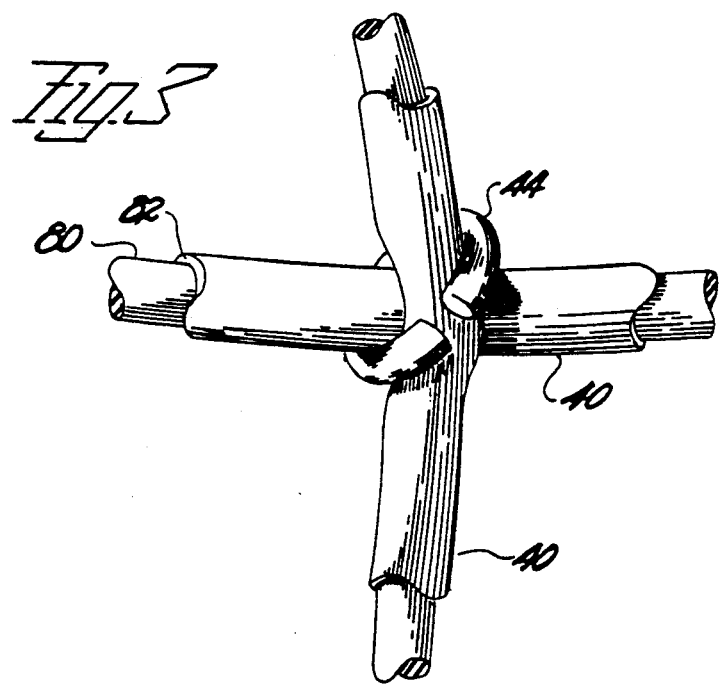
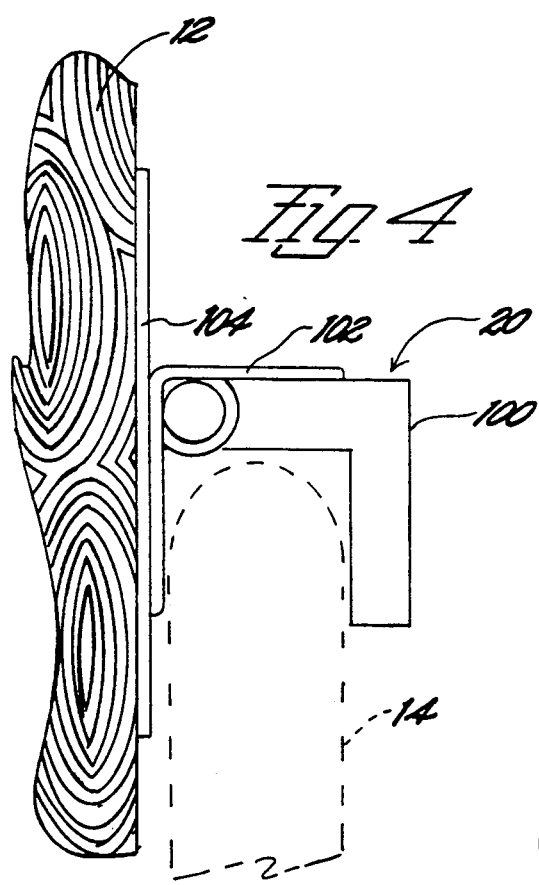
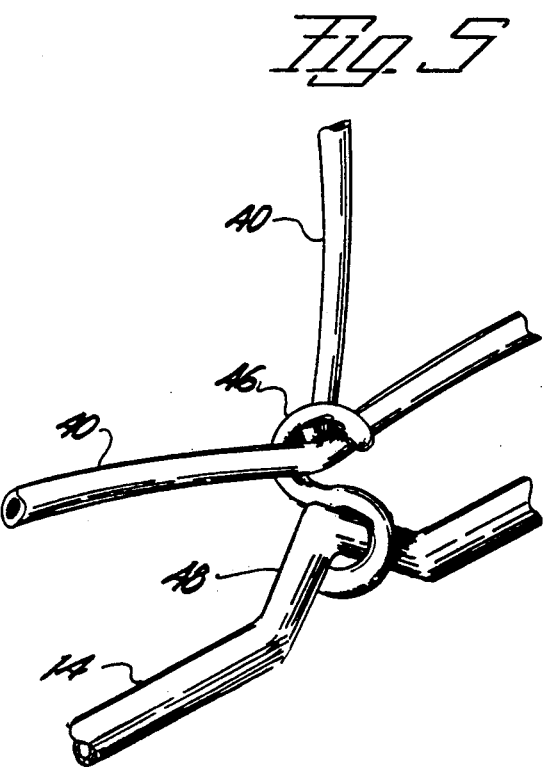

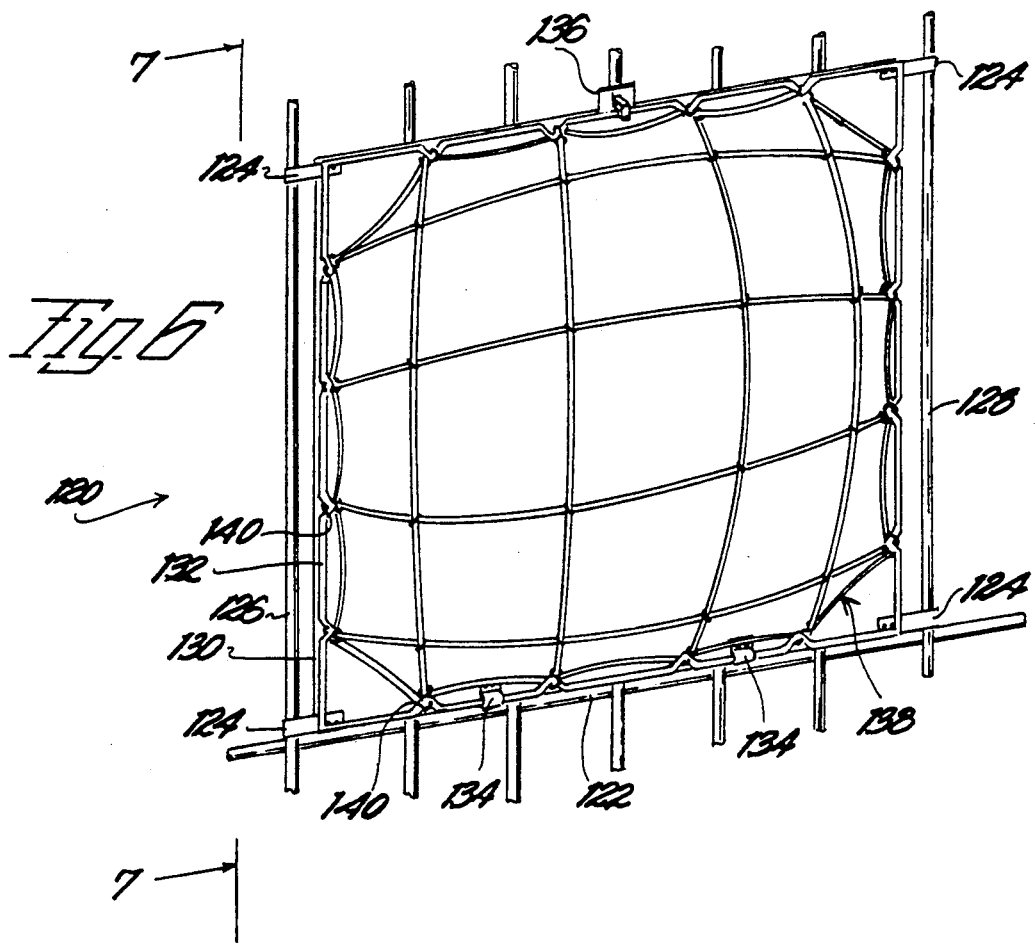
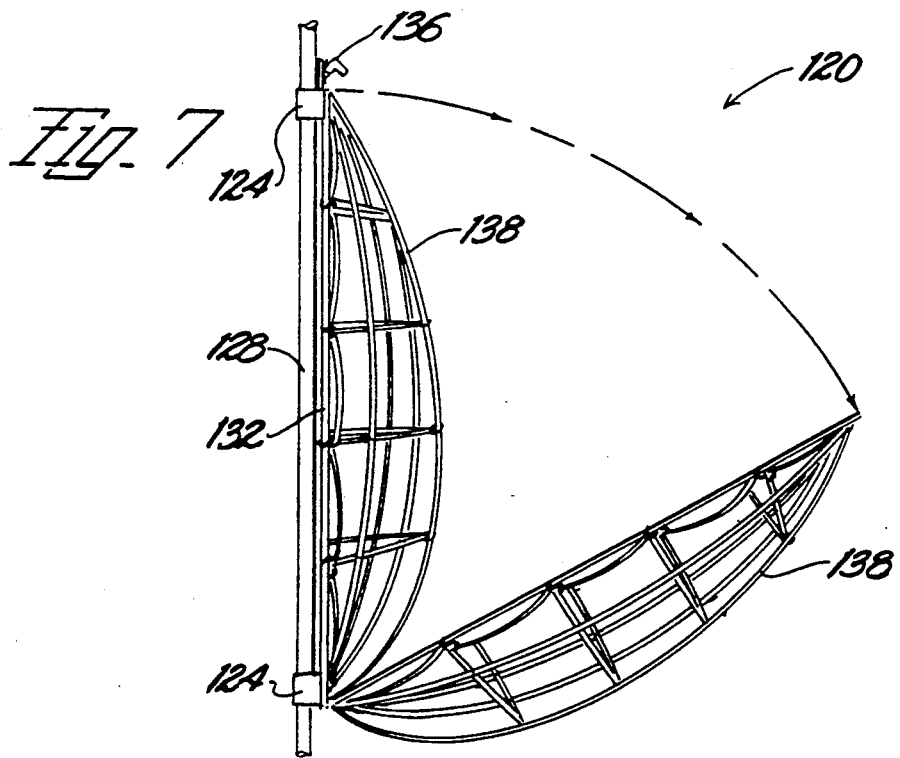

EXPANDABLE HAY FEEDER

BACKGROUND OF THE INVENTION

1. Field of the Invention:

The present invention relates to hay feeders. In particualr, the present invention relates to hay feeders that expand to accommodate variable amounts of hay but limit access the supply of hay.

2. Discussion of Background:

Some animals such as horses are fed hay as a major part of their diet. These animals may consume considerable amounts of hay and feeding them can be a chore. Horses, in particular, tend to scatter hay when they eat, thus adding to the burden of maintaining them. Consequently, hay feeders are available that provide a place for storing a quantity of hay for the animal's unattended consumption and that dispense only a portion of the full quantity stored at a time.

However, there remains a need for a hay feeder that is economical and effective in dispensing hay for animals and can be used as an attachment to a stall or as a portable feeder.

SUMMARY OF THE INVENTION

According to its major aspects and broadly stated, the present invention is a device for use in feeding hay to an animal for use against a wall or other surface. The device comprises a frame, means for attaching the frame to the surface, and a resilient, stretchable grid. The grid is composed of an array of cords made of, preferably, rubber covered with NYLON, or other abrasion-resistant fabric that stretches when hay is placed between the surface and the grid but returns to it unstretched shape as the hay is removed. The individual cords are fastened with clips where they cross and define an array of holes big enough to allow the animal to have access to the hay but small enough to hold the hay to the surface. The cords are attached to the frame by "S" hooks or clips. The grid has an unstretched shape when no hay is in the device but stretches to accommodate the quantity of hay that is placed between it and the surface.

In an alternate embodiment, a surface is included as part of the device to provide support and to oppose the force of the stretched grid, for example, when the device is to be attached to a fence or series of bars forming part of the animal's stall or hung from the side of a horse trailer. The surface can also be used in cooperation with a wall having a hole formed in it so that the surface, hinged and latchable, can be opened as a door from the outside of a stall to add more hay.

A feature of the present invention is the stretchable or expandable grid. The grid accommodates varying quantities of hay and holds them securely so that a large quantity of hay can be held at one time but less is spilled as the animal eats. The rubber core surrounded by abrasion-resistant material such as woven NYLON allows the cords to stretch easily and resiliently yet remain strong against chewing by the animal.

Another important feature of the present invention is the spring latch that holds the frame to the surface. The latch allows the frame to be easily rotated away from the surface for refilling the grid. The latch is biased in the latched position so that it tends to stay latched and is easier to operate.

In one of the embodiments, the surface is hingedly attached on one side of a wall and the frame is attached to the other side with a hole between them. In this embodiment, the surface serves two important functions: it opposes the return force of the stretched grid and it operates as a door for allowing additional hay to be added without the need to enter the stall.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 3 is a detailed view of the clip attaching crossing cords together according to the present invention;

FIG. 4 is a detail of the latch of the hay feeder according to a preferred embodiment of the present invention;

FIG. 5 is a detailed view of the "S" hook attaching the grid to the frame, according to the present invention;

FIG. 6 is a perspective view of another alternative embodiment of the present invention; and FIG. 7 is a side, cross sectional view of the feeder shown in FIG. 6 taken along line 7—7.

DETAILED DESCRIPTION OF PREFERRED EMBODIMENTS

As will presently be described, the present invention is a device for feeding animals that comprises, at a minimum, a frame with a grid attached to it for use in conjunction with a surface. Hay is held between the grid and the surface and is accessible through the grid. The surface may be a wall to which the frame is attached directly, or, in other embodiments, a plate attached to the frame. If the surface is a plate, the plate can be attached to the wall, a grillwork or fence, or left freestanding.

Figure 1:
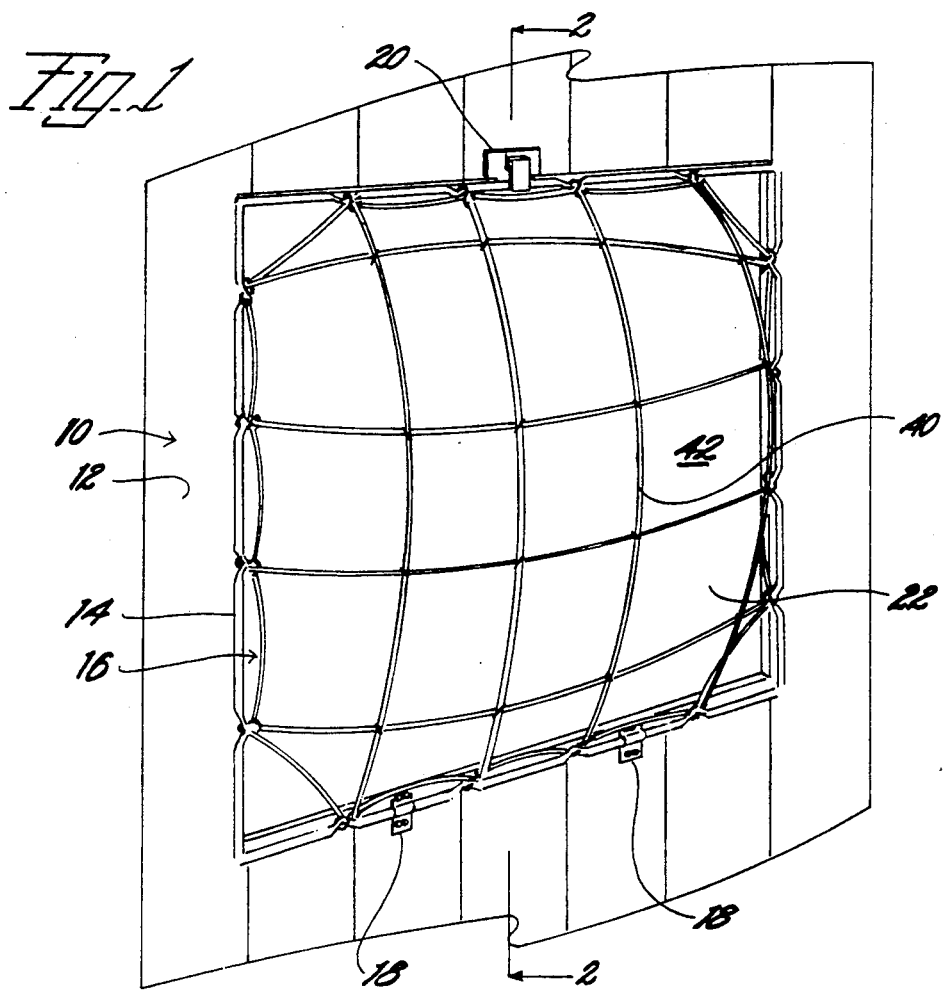
FIG. 1 is a perspective view of a device mounted to a wall according to a preferred embodiment of the present invention.

Referring now to FIG. 1, there is illustrated a hay feeder 10 according to a preferred embodiment of the present invention. In this embodiment, hay feeder 10 is shown used with a wall 12. For simplicity in illustrating hay feeder 10, the hay is not shown. Hay feeder 10 comprises a frame 14 and a grid 16. A pair of hinges 18 hold one side of frame 14 to wall 12 and a spring latch 20 holds the opposing side of frame 14 to wall 12.

By lifting spring latch 20, frame 14 can be rotated away from wall 12 about hinges 18 and a quantity of hay placed on grid 16. Frame 14 can then be relatched. Behind wall 12 is a plate 22.

Grid 16 comprises an array of cords 40 wherein cords 40 will cross several others to define spaces 42. Cords 40 are attached to each other where they cross by clips 44 (FIG. 3) and to frame 14 by "S" hooks 46 (FIG.5), or other suitable clip or attaching device. Instead of clips 44, cords can be knotted or joined in other suitable ways. Frame 14 is crimped or bent to form notches or indentations 48 at intervals along its length. "S" hooks 46 are carried by indentations 48 so that grid 16 maintains it shape and cords 40 maintain their spacings. Instead of "S" hooks 46, clips or other fastening devices can be used, made of metal or plastic, so long as they can hold well, do not hurt the animal and can be detached when grid 16 is to be replaced.

Figure 2:
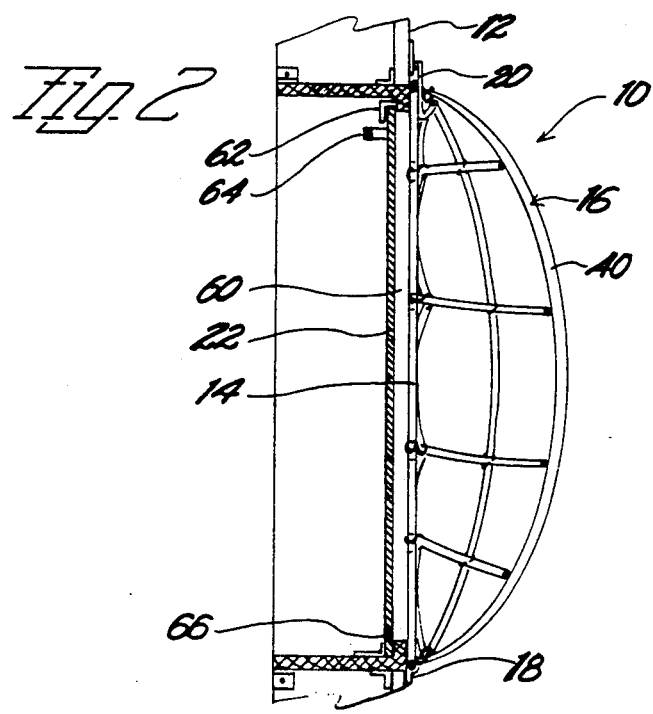
FIG. 2 is a side, partial cross-sectional view taken along line 2—2 of FIG. 1.

In FIG. 2, there is shown frame 14 and grid 16, spring latch 20 and hinges 18 holding it to wall 12. Behind frame 14 is plate 22 mounted inside wall 12 where a hole 60 has been cut to allow access from one side to the other. A latch 62 holds plate 22 in opposition to force applied by grid in its stretched condition. When latch 62 is released, plate 22 can be pivoted using handle 64 about hinge 66 to reload feeder 10 from the left side of wall 12 as shown rather than from the opposite side. In this embodiment, the user does not have to be in a stall to feed a horse, for example, It will be best seen in FIG. 3 that chords 40 comprise a cord 80 surrounded by a sheath 82. Core 80 is made of a stretchable, resilient material, such as rubber, so that it stretches from a relaxed, unstretched condition to a stretched condition determined by the amount of hay placed between grid 16 and the surface opposing the stretched grid 16. Sheath 82 is preferably made of an abrasion-resistant material, preferably NYLON, so that it resists tearing if chewed or bitten by the feeding animal.

FIG. 4 shows a detail of hay feeder 10, namely spring latch 20 comprising a latch 100, a spring 102 holding latch 100 in a latched position and biasing it away from an unlatched position and a mounting plate 104 securing latch 100 and spring 102 to wall 12.

In FIGS. 6 and 7 another embodiment of the present invention is shown. In particular, an expandable hay feeder 120 is shown attached to a fence or grillwork 122 by a set of "J" hooks 124 gripping a member 126 on one side and a member 128 on the other. Hooks 124 are attached to a plate 130 and a frame 132 is in turn attached to plate 130 by a pair of hinges 134 on one side and a spring latch 136 on the other. A grid 138 is held to frame 132 which is crimped to form indentations 140 as described above.

When spring latch 136 is raised from the latched to the unlatched position, frame 132 can be rotated away from plate 130 about hinges 134, as shown in FIG. 7.

The frame of the expandable hay feeder can be attached to a wall, or any other reasonably firm surface, using the spring latch and hinges to hold it in place. The wall would then serve to oppose the stretch grid. Two grids can be joined back to back for adjacent stalls. Then the surface that opposes the stretched grid of one feeder is the stretched grid of the other feeder.

The grid can be any arrangement of cords that creates open spaces through which the animal can bite a small portion of hay, or other leafy vegetation that serves as animal food. Likewise, although the frame is shown as rectangular or square in the accompanying figures, it may have other shapes as long as the grid and surface can be rotated with respect to each other.

It is preferred that the core of the cords be stretchable and resilient so that they can stretch to accommodate a quantity of hay and return to their unstretched shape as the hay is withdrawn. Although a sheath is not necessary, a sheath that resists abrasion from the teeth of the animal and protects the cord from being severed will assure the grid lasts longer than otherwise.

It will be apparent to those skilled in the art that many changes and substitutions can be made to the preferred embodiment herein described without departing from the spirit and scope of the present invention as defined by the appended claims.

What is claimed is:

1. A device for use in feeding hay to an animal and for use with a wall with a hole therethrough, said wall having a first side and an opposing second side, said device comprising:
   a surface;
   a frame in spaced relation to said surface, said frame having a first side and a second side;
   means for holding said frame in spaced relation to said surface, said holding means further comprising a latch to hold said first side of said frame to said first side of said wall and a means for attaching said surface to said second side of said wall so that said surface and said frame have said hole therebetween, said latch having a latched position and an unlatched position, and at least one hinge holding said second side of said frame to said first side of said wall; and
   a grid attached to said frame, said grid formed of a resilient and stretchable material, said grid having an unstretched shape but stretching when said hay is placed between said surface and said grid, said grid holding said hay against said surface and returning to said unstretched shape as said hay is removed..

2. The device as recited in claim 1, wherein said frame has a first side and a second side and said attaching means further comprises a latch for holding said first side of said frame to said surface, and latch having a latched position and an unlatched position, and at least one hinge holding said second side of said frame to said surface; and
   means for biasing said latch to said latched position.

3. The device as recited in claim 1, wherein said frame further comprises:
   hooks for attaching said grid to said frame; and
   means formed along the length of said frame for receiving said hooks.

4. The device as recited in claim 1, wherein said material further comprises:
   a core; and
   a sheath covering said core.

5. The device as recited in claim 1, wherein said grid further comprises:
   an array of cords, each cord crossing several others; and
   means for fastening one cord to another where said cords cross,
   said cords defining a plurality of openings dimensioned to hold said hay but permit access by said animal.

6. A device for use in feeding hay to an animal and for use with a surface, comprising:
   a frame having a first side and a second side, said frame crimped at intervals along its length;
   means for attaching said frame to said surface;
   a grid attached to said frame, said grid formed of an array of cords, each cord having a resilient and stretchable core and a stretchable, abrasion-resistant sheath, said grid having an unstretched shape, said grid stretching when hay is placed between said surface and said grid, said grid holding said hay against said surface, said grid returning to said unstretched shape as said hay is removed; and
   means for attaching said grid to said frame, said means comprising hooks received by said frame where said frame is crimped.

7. The device as recited in claim 6, wherein said attaching means further comprises a latch to hold said first side of said frame to said surface, said latch having a latched position and an unlatched position, and at least one hinge holding said second side of said frame to said surface.

8. The device as recited in claim 6, wherein said attaching means further comprises a latch for holding said first side of said frame to said surface, said latch having a latched position and an unlatched position, and at least one hinge holding said second side of said frame to said surface; and means for biasing said latch to said latched position.

9. The device as recited in claim 6, wherein each cord of said array of cords crosses several other cords to define an array of openings, and said grid further comprises means for fastening one cord to another where one of said cords crosses another cord, said openings dimensioned to hold said hay but permit access by said animal.

10. A device for use in feeding hay to an animal, comprising:

a surface;

a frame in spaced relation to said surface, said frame having a first side and a second side, said frame crimped at intervals along its length;

means for holding said frame in spaced relation to said surface;

a grid attached to said frame, said grid formed of a resilient and stretchable material, said grid having an unstretched shape but stretching when hay is placed between said surface and said grid, said grid holding said hay against said surface and returning to said unstretched shape as said hay is removed; and means for attaching said grid to said frame, said means comprising hooks received by said frame where said frame is crimped.

11. The device as recited in claim 10, wherein said holding means further comprises a latch to hold said first side of said frame to said surface, said latch having a latched position and an unlatched position, and at least one hinge holding said second side of said frame to said surface.

12. The device as recited in claim 10, wherein said device is for use with a wall with a hole therethrough, said wall having a first side and an opposing, second side, and said holding means further comprises:

a latch to hold said first side of said frame to said first side of said wall, said latch having a latched position and an unlatched position, and at least one hinge holding said second side of said frame to said first side of said wall; and means for attaching said surface to said second side of said wall so that said surface and said frame have said hole therebetween.

13. The device as recited in claim 10, wherein said device is for use with a fence comprising at least two parallel members, and said holding means further comprises:

a latch to hold said first side of said frame to said surface, said latch having a latched position and an unlatched position, and at least one hinge holding said second side of said frame to said surface; and means for attaching said surface to said members.

14. The device as recited in claim 10, wherein said attaching means further comprises a latch for holding said first side of said frame to said surface, said latch having a latched position and an unlatched position, and at least one hinge holding said second side of said frame to said surface; and means for biasing said latch to said latched position.

15. The device as recited in claim 10, wherein each cord of said array of cords crosses several other cords to define an array of openings, and said grid further comprises means for fastening one cord to another where one of said cords crosses another cord, said openings dimensioned to hold said hay but permit access by said animal.

* * * * *